Jan. 5, 1937.    W. JACOBI ET AL    2,067,055
DEVICE FOR AVOIDING NONLINEAR DISTORTION
Filed March 13, 1933    2 Sheets—Sheet 1
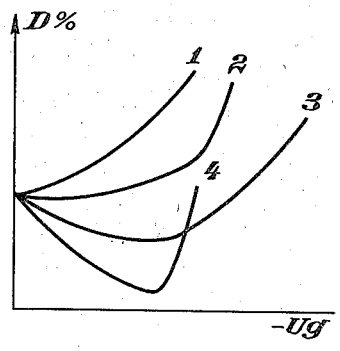
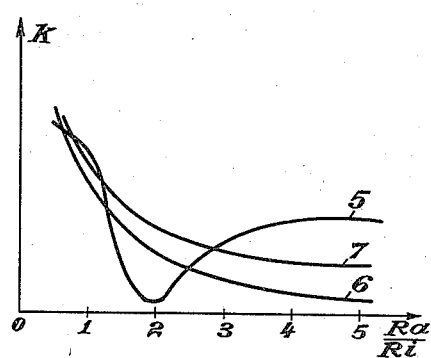
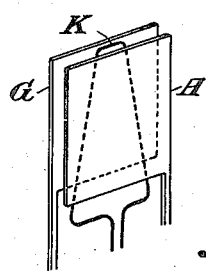
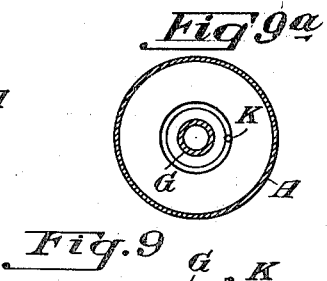
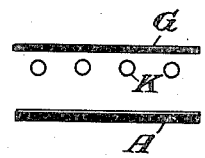
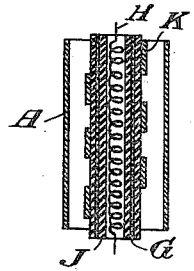
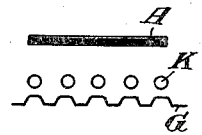
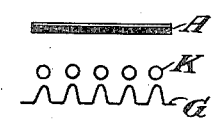
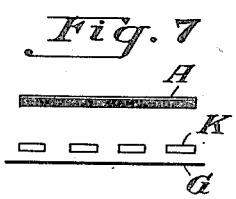
INVENTORS
WERNER JACOBI
RICHARD FELDTKELLER
BY
ATTORNEYS.

Jan. 5, 1937. W. JACOBI ET AL 2,067,055
DEVICE FOR AVOIDING NONLINEAR DISTORTION
Filed March 13, 1933 2 Sheets-Sheet 2
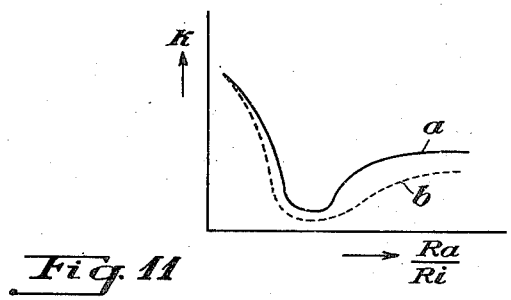
Fig. 11
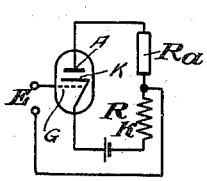 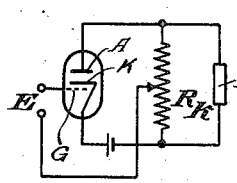 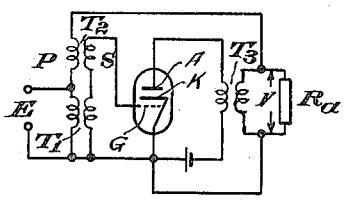
Fig. 12  Fig. 13  Fig. 14
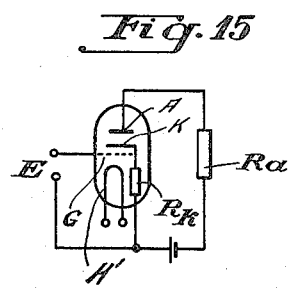
Fig. 15
INVENTORS
WERNER JACOBI
RICHARD FELDTKELLER
BY
ATTORNEYS.

Patented Jan. 5, 1937

2,067,055

UNITED STATES PATENT OFFICE 2,067,055

DEVICE FOR AVOIDING NONLINEAR DISTORTION

Werner Jacobi, Berlin-Spandau, and Richard Feldtkeller, Berlin-Siemensstadt, Germany, assignors to Siemens & Halske, Aktiengesellschaft, Siemensstadt, near Berlin, Germany, a corporation of Germany Application March 13, 1933, Serial No. 660,602
In Germany March 18, 1932

10 Claims. (Cl. 179—171)

Our invention relates to a "device for avoiding non-linear distortion". Devices designed to make the output amplitude of a valve set (for instance of a repeater) linearly dependent on the input amplitudes are well-known in the art. This result is obtained in the known devices by adding certain means (feed-back circuit, additional non-linear circuit elements) having the tendency to give a linear characteristic to the valve employed.

Such a linearity is obtainable only at the cost of an energy loss and can never be complete, since the non-linear distortion factor component, depending on the variable mu-factor (reciprocal of amplification factor) is not compensated.

In devices for avoiding non-linear distortions in valve sets or the like having a non-linear amplitude variation, the present invention employs, for compensation purposes, discharge vessels whose mu-factor grid bias characteristic falls in such a manner, that, for a definite or predetermined adaptation ratio, the overtones produced by the curvature of the working characteristics of the valves or in another way, are compensated for by others depending on the falling mu-factor grid-bias characteristic of one or several valves.

This type of compensation can, of course, only be obtained for a definite adaptation ratio, as the working characteristic and its curvature depend on the load, whereas the mu-factor characteristic remains constant.

For valves having their electrodes arranged normally, (control electrode between anode and cathode) the mu-factor characteristic rises within a large range of grid bias, if the working point has been chosen in accordance with the other conditions to be fulfilled by the valve. Only at a few relatively narrow portions of the grid bias range, the mu-factor characteristic tends to fall. Difficulties are encountered and the gain or power output is reduced, if the working point is chosen so as to utilize those portions at which the mu-factor characteristic has a downward or descending course. On account of the relatively narrow portions which are characterized by a decreasing mu-factor, the control range would also be made very small, so that the idea underlying our invention can be carried into effect only to a small extent when the control is applied to valves having the normal arrangement of electrodes.

According to another feature of the invention, these difficulties can be avoided by the use of so-called counter-control valves. In these valves, the control electrode is located, at least partly, on the side of the cathode opposite to that on which the anode is arranged. Tests have shown that the mu-factor characteristic of such valves is materially better for compensation purposes, than that found for valves with normally arranged electrodes. In opposing (or counter) control valves the mu-factor has, within a large range of grid bias, a tendency to decrease; such valves are known as so-called plate-valves.

In order to obtain a sufficient compensating effect with the aid of counter-control valves, the mu-factor grid bias characteristic should be given a steep downward slope. According to another feature of the invention, the control electrode is, to this end, given a convex shape on the side toward the cathode or the several turns thereof. The same effect may also be obtained by the use of a flat tape or suitable cross-sectional area (elliptical, square or the like) as a cathode, provided the longer side of the cross-sectional area of the cathode tape faces the control electrode.

The scope of the invention does not only include counter-control electrodes shaped, in the manner used up to now, as plates, but use may also be made of the concentric design inherent in valves having their electrodes arranged in the normal way. It is self-evident that a plurality of grids may be arranged within the electrode system to obtain special properties.

As has been mentioned before, a sufficient compensating effect can only be obtained by a rapid fall of the mu-factor with increasing negative grid bias. For this end, measures must be taken generally to reduce the transconductance of the valve. In order to obtain nevertheless valves having a sufficiently high transconductance, and, consequently, furnishing sufficient amplification, the counter-control valves, according to another feature of our invention, are equipped with indirectly heated cathodes. In this way, it is possible to obtain a large cathode surface which, as is well-known, increases the transconductance of the valve.

Counter-control valves with indirectly heated cathodes have their electrodes arranged in a manner which is not only advantageous for the purposes of the above-mentioned linearization, but also for the design of valves strictly speaking. The indirectly heated valves require a great heating power, which makes it often difficult to fulfill the demands made on the control electrode from a thermic and mechanical standpoint. The usual arrangement of the control electrode between cathode and anode involves a grid-shaped control electrode enabling the electrons to pass from the cathode on to the anode. These conditions result in a control electrode whose mechanically very sensitive design is acted on very unfavourably by the evolution of great heat at the indirectly heated cathode. We avoid these drawbacks by the arrangement of the grid-shaped control electrode on the side of the indirectly heated cathode opposite to that on which the anode is located. The control electrode need no longer be given the shape of a grid and may have sufficiently large dimensions, as sufficient room is available. It may, for instance, be given the shape of a plate, and may, at any rate, be provided with smaller openings, than in the design used up to the present.

A further material advantage of the electrode design according to the invention is that a solid insulating material may be used between cathode and control electrode. It is therefore permissible to heat the control electrode to a temperature higher than that of the emission, since an electronic current emanating from the control electrode cannot be developed. The use of the solid insulating material facilitates, in addition, the maintenance of the distance between control electrode and cathode. In the case of a concentric arrangement of the electrodes, the control electrode may be used to screen the cathode from the heater. To this end, the control electrode must be made sufficiently large and of suitable material, for instance nickel. If in this design, control electrode and cathode are not separated from one another by a solid insulating body, the control electrode should be made of a material, say tungsten, which is not yet emissive at a temperature lying between those of the cathode and the heater.

From the above considerations on the electrode design, it results that the counter-control valve with indirectly heated cathode offers advantages also for fields of application, lying outside the scope of the invention, i. e. for amplifiers not having a linearizing tendency.

As has been stated above, the compensation of non-linear distortions according to the invention, can be carried into effect only for a definite adaptation ratio, or for a definite range. In cases where the load resistance experiences variations, and is, for example, largely dependent on the frequency, the object of the invention is to reduce the response of the compensation effect to the adaptation ratio, by combining the device for compensation purposes described above with other known linearizing circuits. These, i. e. negative feed-backs, applied alone, have the drawback that the amplification decreases in proportion as the linearizing effect is improved. In some devices of the well-known type, the theoretic optimum of equalization occurs only for the amplification factor 1. If, however, these devices are used together with a device such as contemplated by our invention, the minimum of the non-linear distortions (minimum of non-linear distortion coefficient) is enlarged, in terms of the adaptation ratio, whereby it is not necessary to dimension the known linearizing devices so as to cause a considerable reduction in amplification.

If, according to the invention, we use the combination in circuits in which behind the amplifier to be linearized, provision is made for filters, which only allow a definite frequency band to pass, the minimum of the non-linear distortion coefficient may be chosen narrower than the frequency band to be transmitted, by omitting or eliminating the upper octave thereof. The overtones of the upper octave produced by the rise of the non-linear distortion coefficient to a value greater than permissible, are at any rate, suppressed by the filters under consideration, so that their occurrence need not be prevented by other means.

The object of the invention is furthermore to include the circuit elements (ohmic resistances) required for obtaining a linearizing effect, say a negative feed-back in the valve bulb, so as to produce a unit valve working linearly throughout a large range of adaptation.

Several typical constructional examples of the device according to the invention will be given hereafter. The use of counter-control valves enables the characteristic of transmission systems, and more particularly amplifiers, to be linearized by simple means. The invention therefore offers advantages in all the cases where non-linear distortions are objectionable. The most important constructional examples of the invention are amplifiers for multi-channel carrier frequency systems of any kind, such as transmission systems for H. F. telephony, telephony over power lines, multiplex telegraphy, ultra- and infra-acoustic telegraphy, remote control etc. The linearization permits of avoiding an intermodulation of the various frequency channels which are enabled to be squeezed more closely together.

As to the reduction in intermodulation the invention is also applicable to telephone repeaters in multi-conductor cables.

In case of music amplifiers, more particularly for broadcasting and sound film purposes, the use of the invention can bring about an elimination of overtones and thereby materially improve the sound spectrum.

The invention is furthermore important for secrecy systems involving a reversal or transposition of the speech band. Interfering sounds in the decoded speech can be avoided.

As other constructional examples of the invention mention may be made of amplifiers for measuring sets (voltage indicators, level meters, measuring amplifiers, etc.) The test error can in this way be reduced and the filtering means, required up to the present for the suppression of overtones, can be simplified or even dispensed with.

In the accompanying drawings, Figs. 1 and 2 are diagrams explanatory of the principles underlying our invention; Fig. 3 is a perspective view of a portion of a valve such as may be used for the purposes of our invention; Figs. 4 to 8 are diagrammatic views representing further electrode arrangements, Fig. 8 illustrating the effect obtained; Figs. 9 and 10 are vertical sections showing electrode arangements with cylindrical anodes and control electrodes; Fig. 9a is a cross section of the construction shown in Fig. 9; Fig. 11 is a diagram illustrating the effect of circuit arrangements such as shown in Figs. 12 to 15, which are diagrams of various circuits which may be employed in connection with valves, according to our invention.

The fundamental principle underlying the invention will be explained with the aid of Figures 1 and 2. In Fig. 1, the ordinates indicate the non-linear distortion coefficient D, while the abscissae indicate the negative grid bias $-U_g$. The whole of the current flowing in the output circuit of a valve loaded for instance with the external resistance zero, may be expressed as follows:

$$I = I_a + \frac{dI_a}{dU_g} \cdot \mathcal{U}_o + \frac{1}{2} \cdot \frac{d^2 I_a}{dU_g^2} \cdot \mathcal{U}_o^2 + \ldots \quad (1)$$

where $I_a$ is the D. C. component of the plate current, $U_g$ the grid bias and $\mathcal{U}_o$ the alternating grid voltage. In this equation of the working characteristic, the second term represents the fundamental wave of the outgoing alternating current and the third its second harmonic. The non-linear distortion coefficient determined by this third term is then:

$$Kst = \frac{1}{4} \frac{\frac{d^2 I_a}{dU_g^2}}{\frac{dI_a}{dU_g}} \cdot \mathcal{U}_o \quad (2)$$

It will be called hereafter "non-linear distortion coefficient of current".

The well-known fact that the mu-factor of a valve is not constant over large ranges, but a function of the grid bias $U_g$ and the anode voltage $U_a$ equally results in a non-linear distortion coefficient $Kd$, which may be given for instance by the third term of equation $$U = U_a + \frac{dU_a}{dU_g} \cdot \mathcal{U}_o \pm \frac{1}{2} \frac{d^2 U_a}{dU_g^2} \cdot \mathcal{U}_o^2 \quad (3)$$

(U=total output voltage, $U_a$=anodic D. C. voltage). It may be written as follows:

$$Kd = \frac{1}{4} \frac{\frac{d^2 U_a}{dU_g^2}}{\frac{dU_a}{dU_g}} \mathcal{U}_o \quad (4)$$

and will be designated by "non-linear-distortion coefficient of mu-factor."

The amplitudes of the two harmonics produced by the two non-linear distortion coefficients under consideration are added one to the other, if the third term to the right of Equation (3) has a positive sign, which means that the mu-factor of the valve increases with increasing negative grid bias, and are substracted one from the other if this sign is negative (falling mu-factor). This last case is according to the invention utilized to suppress or reduce the higher harmonics and, as has already been mentioned, most advantageously with the help of counter-control valves.

The relation of a non-linear distortion coefficient $k$, compensated for in accordance with our invention, to the adaptation ratio is shown in Fig. 2, in which curve 5 represents such relation between the compensated nonlinear distortion coefficient and an example in which the adaptation ratio $$\frac{R_a}{R_i}$$

is equal to 2, where $R_a$ indicates the (external) resistance of the output circuit, and $R_i$ the internal resistance of the valve or tube. For the sake of comparison, Fig. 2 also shows the curve 6 representing the corresponding relation in the case of a non-compensated non-linear distortion coefficient and a constant mu-factor, while the curve 7 represents a relation similar to that in curve 6, except that a variable mu-factor has been assumed. Curve 5 would thus be obtained with the mu-factor represented by curve 4 in Fig. 1, whereas curve 7 would be determined by a mu-factor according to curve 1 or 2 in Fig. 1.

The method may, of course, also be applied to valves mounted in cascade, whereby, in case of need, one or several valves with decreasing mu-factor may enable the non-linear distortion coefficients of all the valves to be compensated for.

As has been mentioned above, the non-linear distortion coefficient may be compensated for any given adaptation ratio; but the invention will essentially be applicable to the cases $$\frac{R_a}{R_i} = 1 \text{ and } \frac{R_a}{R_i} = 2.$$

$R_a$ indicates the resistance of output circuit and $R_i$ the internal resistance of the valve or tube.

According to the invention, it is also possible to eliminate non-linear distortion emanating from circuit elements (say iron) other than valves, by introducing one or several valves, dimensioned according to the invention, at any given point of the transmission system to be improved.

Whether high-vacuum tubes or gas-filled vessels may also be employed and valves having directly or indirectly heated cathodes or gas cathodes, i. e. an ionized gaseous chamber instead of a heater as a source of electrons, must be decided for each case on its own merits.

Constructional examples of the inventive idea have been represented in Figs. 3 to 10 and 12 to 15. Figs. 3–7 show the electrode design of the counter-control valve, Fig. 8 serves to explain the physical effect of the grid shape under consideration. Figs. 10 and 15 show counter-control valves with indirectly heated cathodes. Figs. 12 to 15 show the counter-control valves in combination with known linearizing circuits, whereas Fig. 11 illustrates the effect of these circuits on the characteristic of the non-linear distortion coefficient.

Counter-control valves are known as so-called plate valves. In Fig. 3 such a valve is shown for illustration purposes. The cathode K is located between the anode A and the control electrode G which, like the anode, has been given the shape of a plane plate.

As has already been mentioned above, a steep fall of the mu-factor with increasing negative grid bias can be obtained by a suitable shaping of the control electrodes and cathode. Figs. 4–7 show constructional examples of this electrode design. Figs. 5 and 6 show the control electrode G as having convex portions or ridges extending toward the cathode K, Fig. 7, illustrates the application of a tape-shaped cathode.

The suitability of the shape of electrodes under consideration can be explained as follows: If we imagine the lines of force distributed over an area between a cathode K (Fig. 8) and a plate-shaped control electrode G having a smooth surface, the density of the lines of force will be least at points midway between adjacent turns of the cathode. At these points, the mu-factor is materially higher than at the points shielded by the lines of force emanating from the cathode turns. The mu-factor of a valve and, consequently, the compensating effect thereof will decrease with increasing ratio of the areas of low-mu to those of high-mu along the surface of the control electrode.

This ratio might be increased by removing the grid from the cathode which would however result in a decrease of transconductance, as the action of the grid potential on the electronic current naturally decreases with increasing distance between grid and cathode. The construction shown in the diagrammatic view Fig. 8 is practically identical with the one illustrated by Fig. 4. In the examples shown in Figs. 5—6, a high compensating effect is obtained simultaneously with a high transconductance.

The invention provides, in addition, a screen grid between anode and control electrode, in order to shape the mu-factor characteristic in the way required to eliminate distortions called forth by a given curvature of the characteristic.

Figs. 9, 9a, and 10 show a countercontrol valve having an anode A and a control electrode G both of cylindrical form. The cathode K is located between said anode and said control electrode, and is shown as of helical shape. The thermic conditions are exceedingly favorable in these constructions, and satisfactory cooling is provided for within the space intervening between the anode and the cathode. This design is therefore particularly suitable for high-power valves.

In Figs. 9 and 9a, the helical cathode itself constitutes the heater element of the valve. In Fig. 10, the valve is heated indirectly by means of a (preferably filamentary) heater H. This heater, which extends axially within the concentric electrode system, is surrounded by an insulating body J, say of sinter-corundum. The cylindrical control electrode G is fitted in the insulating body, and the active cathode layer K is placed on the outer surface of the insulating material. In this embodiment of our invention, the cathode has the shape of a helical or any other suitable form, having gaps preventing the control electrode from being completely shielded by the cathode. It is, for instance, possible to form the cathode as a cylinder with interrupted envelope surface and slip such cathode over the insulating body.

The control electrode is made so stable as to stand the high temperature; it is, in addition, evident that such electrode is absolutely insensitive to mechanical vibrations. Difficulties are not encountered in keeping the distance between control electrode and cathode extremely small.

With a view to obtaining the desired mu-factor, the surface of the control electrode which faces the cathode can be constructed in a given manner; it can, for instance, be made convex toward the cathode (see Figs. 5 and 6). The same effects may be obtained by a correspondingly shaped inner surface of the cathode (see Fig. 7).

The electrode arrangement described in connection with Fig. 10 can conveniently also be applied to plate-shaped electrode systems, according to Fig. 4. Also in this case, it is possible to locate the control electrode between heater and cathode (if a separate heater element is used in conjunction with anode, cathode, and control electrode) and in case of need to seal it into the insulating compound. The control electrode can also be used as a support of the heater to be insulated from it and as a cathode. If the control electrode is located between heater and cathode, the heater should be covered with the emissive material both on the side facing the control electrode and on that facing the anode. Provision is made for gaps in the cathode, in order to prevent the control electrode from being shielded from the anode. The insulating body J shown in Fig. 10 can be dispensed with, if the control electrode having the shape of a hollow cylinder is covered inside and outside with an insulating material, say an oxide layer. The heater must then be fitted within the hollow space of the control electrode, whereas the emissive cathodic layer must be placed on the outer insulating layer of the control electrode.

An object of the invention is furthermore to insulate the control electrode from the heater. In this case the control electrode may be given the shape of a simple wire. The heating current then produces potential variations between control electrode and cathode, which permits this arrangement to be applied only when the disturbances involved are permissible or may be eliminated by other means.

Evidently it is within the scope of the invention to provide in addition to the control electrode, other electrodes of grid-shape between anode and cathode. In this case, the described shape of the control electrode is most favourable, as it is not necessary to place two or even three grids within the space between cathode and anode. Instead of the control electrode, any other electrode acting on the discharge process may, of course, be placed in the manner described outside the space between cathode and anode.

Fig. 11 shows the non-linear distortion coefficient $k$ as a function of the adaptation ratio $$\frac{R_a}{R_i}$$

Curve $a$ shows the characteristic of this coefficient for a counter-control valve as shown in Fig. 2 by curve 5. For a definite adaptation $$\frac{R_a}{R_i}$$

the minimum of the non-linear distortion coefficient is relatively pronounced. Now, if the device used for the compensation of the non-linear distortion coefficient with the aid of a counter-control valve, as has been mentioned above, is combined with other known linearizing circuits, the minimum will be considerably enlarged, as may be seen from curve $b$. The range within which the non-linear distortion coefficient is small is sufficiently large to enable this coefficient, for the most important fields of application, to be kept below very low limiting values, over the entire transmission range.

Further details of the combination according to the invention, will be explained with the help of the constructional examples shown in Figs. 12-15.

Fig. 12 shows a counter control electrode valve in which a negative feedback voltage is tapped on a coupling resistance $R_k$ in series with a load resistance $R_a$. The total voltage applied to the grid circuit is composed of the input voltage E and the voltage drop occurring at the resistance $R_k$.

Fig. 13 shows a similar set, in which, however, the negative feed-back voltage is tapped on a resistance $R_k$ in parallel with the load $R_a$. While the linearizing effect of the two circuits is approximately the same, they differ in the way they act on the internal tube resistance. In the circuit shown in Fig. 12, the internal tube resistance is increased by the use of negative feedback and, in the circuit shown in Fig. 13, it is decreased. In both circuits it is possible to shift the minimum of the non-linear distortion coefficient in dependency on the load resistance $R_a$.

by varying the amount of the negative feed-back, since the variation of the tube resistance corresponding thereto enables the adaptation ratio to be kept constant.

Fig. 14 shows a counter-control valve to the grid circuits of which, in addition to the input voltage E, a voltage is applied which is proportional to the difference between the input voltage E and the output voltage V existing at the load resistance $R_a$. This voltage is applied to the grid circuit through the transformer $T_2$. The voltages E and V are opposed in phase and are impressed on the ends of the primary P of this transformer. In case of voltage equality, the winding is dead, whereas a difference between these voltages results in a current proportional to these variations and thus in the occurrence of a corresponding voltage in the grid circuit at the secondary S of the transformer $T_2$. The difference voltage and the input voltage transmitted by $T_1$ are connected in series at the grid. The phase relations are in this case chosen so as to enable the voltage existing at the winding S to decrease the difference between the voltages E and V. In the design under consideration, the amplification factor is equal to 1. Another value may however also be taken, if not the total output voltage V, but only a fraction thereof is fed back.

Fig. 15 shows a counter-control valve in which the reaction resistance $R_k$ is fitted into the glass bulb of the valve. The circuit is substantially in accordance with that shown in Fig. 12, except that the battery is shown as located between the load resistance $R_a$ and the junction point of the wires leading to the coupling resistance $R_k$ and one of the voltage terminals E respectively. At H' we have indicated a filament, connected with a current source (not shown), for the indirect heating of the valve. The constructions shown in Figs. 12, 13 and 14 are also intended to be heated indirectly by a separate heater, as in Fig. 15, but in order to simplify the illustration, such heater has been omitted from Figs. 12, 13 and 14.

We claim:

1. In an electrical circuit, an electron discharge tube or valve having an anode, a cathode, and a control electrode or grid, an input circuit and an output circuit connected with said electrodes, the bias supplied to said control electrode being such as to lie within the range at which the mu-factor decreases with increasing negative grid potential, in such a manner that, for a definite value of the ratio between resistance of the output circuit and the internal resistance of the valve, those non-linear distortions which are due to the curved nature of the anode current-grid potential characteristic will be compensated by those non-linear distortions which are due to variations of the mu-factor arising from variations of the grid potential.

2. In an electrical circuit, an electron discharge tube or valve having an anode, a control electrode or grid, and a cathode located between said anode and said control electrode, an input circuit and an output circuit connected with said electrodes, the construction of the electrodes, the distance between the electrodes, and the bias supplied to said control electrode being such that those non-linear distortions which are due to the curved nature of the anode current-grid potential characteristic will be compensated by those non-linear distortions which are due to variations of the mu-factor arising from variations of the grid potential.

3. A system according to claim 2, in which the control electrode is convex toward the cathode.

4. A system according to claim 2, in which the cathode is formed as a flat wire or tape.

5. A system according to claim 2, in which means are provided for indirect heating of the tube.

6. A system according to claim 2, in which means are provided for indirect heating of the tube and in which the control electrode is located between the cathode and the heating means.

7. A system according to claim 2, in which the control electrode is cylindrical.

8. A system according to claim 2, in which the control electrode is separated from the cathode by solid insulating material.

9. A system according to claim 2, in which there are provided additional linearizing circuits, for instance negative feed-back circuits.

10. A system according to claim 2, in which there are provided additional linearizing circuits including elements which are within the discharge tube.

WERNER JACOBI.
RICHARD FELDTKELLER.